United States Patent
Sing et al.

[11] Patent Number: 6,147,462
[45] Date of Patent: Nov. 14, 2000

[54] BALLAST

[75] Inventors: Roland Sing, Hintersteinenberg; Gert Knobloch, Pluederhausen, both of Germany

[73] Assignee: Vossloh-Schwabe Elektronik GmbH, Urbach, Germany

[21] Appl. No.: 09/292,931

[22] Filed: Apr. 16, 1999

[30] Foreign Application Priority Data

Apr. 16, 1998 [DE] Germany ............................ 198 16 815

[51] Int. Cl.⁷ ............................................. G05F 1/00
[52] U.S. Cl. ......................... 315/307; 315/224; 315/360; 315/DIG. 5; 315/DIG. 7
[58] Field of Search ............................ 315/209 R, 224, 315/225, 291, 307, 313, 321, 360, DIG. 2, DIG. 5, DIG. 7

[56] References Cited

U.S. PATENT DOCUMENTS

| | | | |
|---|---|---|---|
| 4,349,748 | 9/1982 | Goldstein et al. | 315/360 |
| 4,460,849 | 7/1984 | Virtanen | 315/209 R |
| 4,554,487 | 11/1985 | Nilssen | 315/224 |
| 5,363,018 | 11/1994 | Shackle | 315/DIG. 7 |
| 5,636,111 | 6/1997 | Griffin et al. | 315/225 |
| 5,729,097 | 3/1998 | Holzer | 315/DIG. 5 |
| 5,959,408 | 9/1999 | Steel et al. | 315/291 |
| 6,011,358 | 1/2000 | Knobloch et al. | 315/224 |

FOREIGN PATENT DOCUMENTS

| | | | |
|---|---|---|---|
| 3925654 | 8/1989 | Germany | H05B 41/36 |
| 0558772 | 3/1992 | Germany | H05B 41/29 |

*Primary Examiner*—Don Wong
*Assistant Examiner*—Thuy Vinh Tran
*Attorney, Agent, or Firm*—Foley & Lardner

[57] ABSTRACT

In a ballast for parallel operation of discharge lamps in potentially explosive areas, an inverter is provided which has a branch which is assigned to the two discharge lamps, and in this respect is used twice. Two lamp-specific branches can be switched off separately if a fault occurs at the assigned discharge lamp.

15 Claims, 2 Drawing Sheets

BALLAST

BACKGROUND OF THE INVENTION

The invention relates to a ballast which is set up for parallel operation of discharge lamps and is provided, in particular, for surroundings where safety is important.

In potentially explosive surroundings, electrical equipment is operated, as a rule, in housings which are specifically suited to its application in order to prevent explosive or combustible gas-air mixtures from being ignited by the equipment. Nevertheless, the requirement exists that the equipment should not cause ignition even if it is held in inappropriate housings. In addition, no impermissible voltages are to occur.

Fluorescent lamps and gas discharge lamps generally have a limited service life. In the event of a fault or toward the end of their service life, the lamps may fail to start or no longer start reliably. In such instances, it has to be ensured that excessively high voltages, such as starting voltages, are not permanently present across the gas discharge lamp. On the other hand, a luminaire having a plurality of lamps is frequently intended to operate on one ballast so that, in the event of failure of one lamp, the luminaire as a whole can continue to illuminate, albeit at a reduced brightness. However, for economic reasons the lamps of a luminaire are to be powered as much as possible by a common ballast.

A circuit arrangement for operating a plurality of fluorescent lamps with a single ballast is known for this purpose from EP 558 772 A1. The ballast has an inverter which supplies a symmetrical AC voltage at a fixed frequency. Two fluorescent lamps are connected in parallel with the invertor, in each case via current-limiting series inductors. The two fluorescent lamps are connected to a monitoring device, which establishes whether the starting voltage is present at one of the fluorescent lamps for longer than a prescribed time interval T1. A switchover relay between the fluorescent lamps and the series inductors permits the two fluorescent lamps to be connected in parallel with one of the series inductors. If the monitoring device establishes a fault state in which the starting voltage is present at one of the fluorescent lamps for longer than the prescribed time interval, such an occurrence is interpreted as an instance of a fault. The switchover relay, which normally individually switches the two fluorescent lamps to be in series with the series inductors assigned to them, instead switches the fluorescent lamps to be parallel to one another and to one of the series inductors.

As a result, the non-ignited fluorescent lamp receives only the operating voltage of the ignited fluorescent lamp. However, this also means that the non-ignited fluorescent lamp is not off. Moreover, a mechanical relay is necessary.

SUMMARY OF THE INVENTION

It is the object of the invention to minimize risks that may occur as a result of lamps and their ballasts being present in potentially explosive surroundings.

This object can be achieved by means of a ballast having the features of patent claim 1.

The ballast according to the invention permits the voltage present at a failed fluorescent lamp to be reduced to zero when the lamp has not been ignited. For this purpose, according to the invention, the ballast has an invertor with a plurality of line branches, of which at least one line branch is jointly assigned to the two lamps, and at least two line branches are separately assigned to the two lamps. By contrast, with two unmeshed inverters which are completely independent of one another, such an inverter permits economies to be made on components. On the one hand, this serves the operational reliability of the ballast, because failures become less likely as the number of components drops. In addition, this constitutes a saving in costs and space. A small number of switching elements in the invertor simplifies the drive circuit.

On the other hand, the specific assignment of individual line branches to the individual lamps permits the failed lamp to be switched off electronically to such an extent that there is no longer a voltage drop across the lamp. This can be achieved without a mechanical relay. For example, a relay losing the ability to switch over due to sticking of its contacts would go unnoticed during correct operation of the ballast and the connected operational lamps. Only in the instance of a fault does the lamp need to be switched off, which is performed in the case of the present invention by blocking the switching elements in the lamp-specific branches. This takes palace solely with the aid of the switching elements of the invertor, whose operational readiness is confirmed by the previous correct operation of the ballast.

There is a double gain in reliability. One gain resides in the avoidance of a voltage drop across a lamp which is not being ignited. In addition, the use of components for bringing about this switched-off state and whose functioning is necessary for the correct normal operation of the ballast is verified.

The ballast preferably contains a mains-operated voltage source which supplies a prescribable or a prescribed DC voltage. It can be ensured in this way that the power converted at a lamp does not change when the other lamp fails.

In a particularly simple design, the invertor is formed by two half bridges which make common use of a switching element. Two or more half bridges can be combined in this way, with only one additional switching element and, if appropriate, one decoupling element for each further half bridge being expedient. Diodes, for example, can serve as such decoupling elements. The invertor is formed in this case by three switching transistors and two decoupling diodes.

In a modified embodiment, it is also possible to provide an invertor with three bridge branches. While one bridge branch is assigned to the two discharge lamps and operates continuously, the other two bridge branches are assigned individually to a respective discharge lamp and driven as a function of its operational readiness and/or ability to ignite. A total of six switching elements are provided, which makes it possible to dispense with decoupling elements. Each discharge lamp is arranged in the quadrature-axis branch of a full bridge. If required, it can be connected in series with a current-limiting component, such as an inductor. Alternatively, the individual-lamp bridge branch can have a current limiter.

Each discharge lamp can be separately assigned a respective starter circuit. This provides the discharge lamp with high-voltage pulses or starting voltage pulses up to the ignition of the discharge lamp and/or up to the lapse of a maximum ignition period. The two discharge lamps can thereby be ignited independently of one another.

The invertor concept according to the invention is designed such that the discharge lamps are provided with separate current limiters, such as inductors. This is particularly expedient with regard to the failure of one of the discharge lamps, because the remaining lamp then continues to operate at the prescribed power. In this case, the invertor concept according to the invention makes it possible to manage the two discharge lamps with a single drive circuit, which drives the inverter.

The ballast is preferably operated at a fixed frequency, which is shifted toward another frequency for ignition. The discharge lamp is preferably arranged in this case in a resonant circuit which operates in the vicinity of its resonant frequency during ignition and remotely therefrom during normal lamp operation. However, it is also possible to operate just at a fixed frequency of the lamp circuit, given an appropriate design of the lamp circuit.

Monitoring the ignition of the individual discharge lamps is possible by tapping the lamp voltage, or a voltage corresponding thereto, in each lamp branch. Each discharge lamp is preferably assigned a separate monitoring device associated with the monitoring circuit, which checks how long the starting voltage generated by resonance step-up is present across the discharge lamp. If the time overshoots a fixed limit, the relevant lamp-specific branch of the invertor is shut down.

It is possible both to carry out the voltage monitoring in the time window in which operations are at the ignition frequency and to continue the monitoring beyond the time window, or to start only thereafter. In any case, a check is made at least at one instant as to whether the lamp voltage has collapsed to the operating voltage, that is to say below a value lying above the operating voltage. If not, the discharge lamp is held not to have been ignited.

After once detecting a state in which a discharge lamp is not ignited, the monitoring circuit remains in its blocking state. This state is preferably maintained until the mains voltage is separated from the ballast. This can be performed with an appropriate reset device actuated by the mains voltage. It is possible in this case for resetting to be triggered only when the mains voltage has been interrupted for a minimum period of time. A timer can serve this purpose. If required, the monitoring circuit can also be reset by other means, for example, a separate switch or a detecting device which detects replacement of the discharge lamp.

Preferably, at least two tapping circuits for supplying voltage to the drive circuit are provided and are connected to the lamp-specific branches of the invertor. As a rule, the tapping circuit displays capacitive behavior at its input. Connection to the lamp-specific branches keeps the capacitive loading of the jointly used inverter branch low, and this keeps its switching losses within limits or minimizes them. This is true particulary in the case of embodiments with decoupling elements between the lamp inductor and the switching element of the common branch of the inverter.

The advantages of the ballast according to the invention come into play particulary in the case of ballasts which are set up for direct ignition of the discharge lamps without preheating of the electrodes. In this case, it is possible for substantial starting voltage step-ups to occur, which are necessary for the unheated ignition of the discharge lamps. It is advantageous for operation in potentially explosive surroundings if the permanent existence of such voltage step-ups can be avoided.

Further advantageous details of embodiments of the invention are the subject matter of subclaims, and can be gathered from the drawings and/or the associated description.

BRIEF DESCRIPTION OF THE DRAWINGS

Exemplary embodiments of the invention are represented in the drawings, in which.

DESCRIPTION OF THE PREFERRED EMBODIMENT

Figure 1:
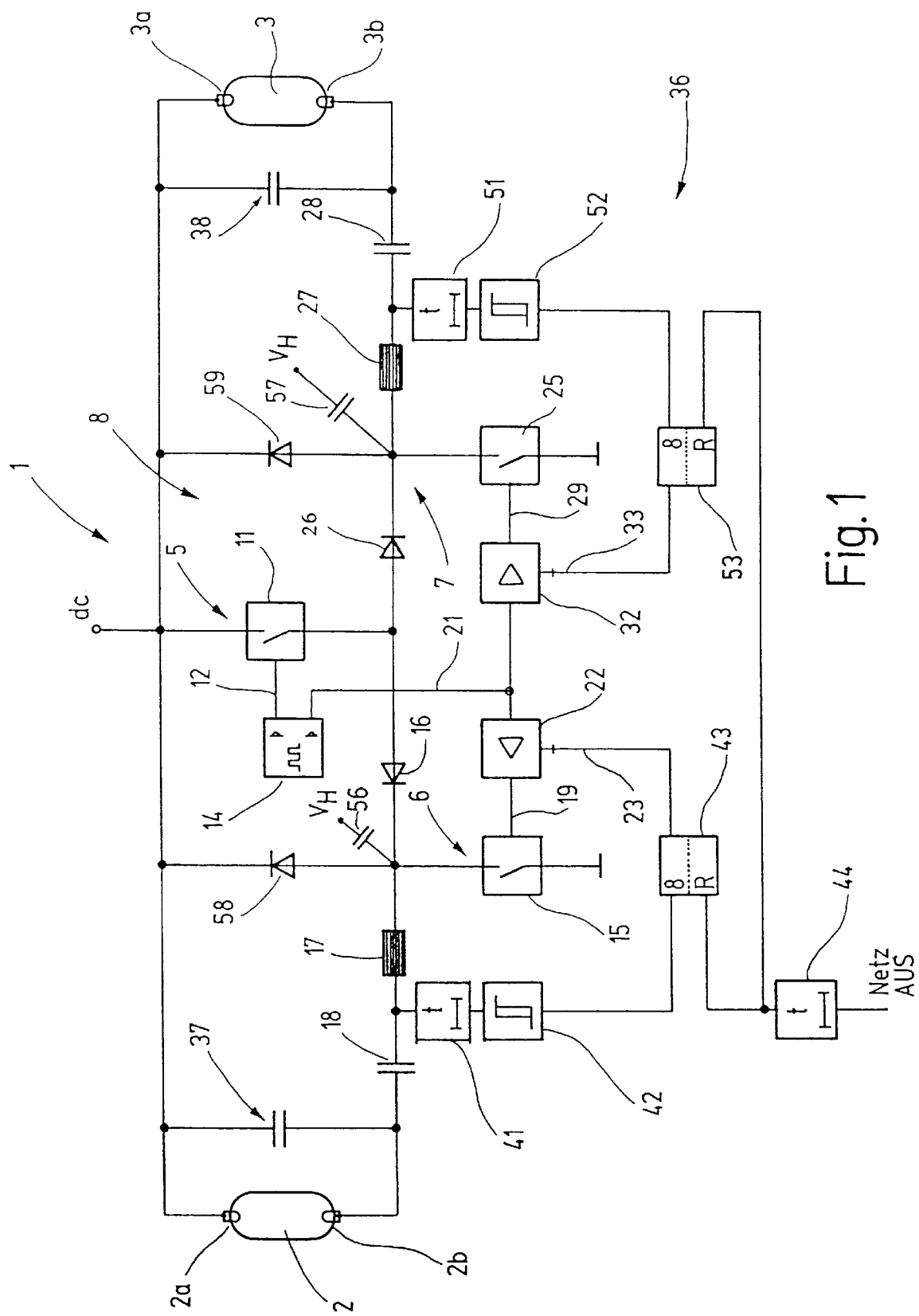
FIG. 1 shows a ballast consistent with the present invention in an extract from a block diagram as a basic representation.

A ballast 1 for operating two discharge lamps 2 and 3 is illustrated in FIG. 1. The discharge lamps 2 and 3 are low-pressure gas discharge lamps, such as fluorescent lamps with helical electrodes. The ballast 1 and the discharge lamps 2 and 3 are provided for use in potentially explosive areas. In order to be able to dispense with preheating the electrodes 2a, 2b, 3a and 3b of the discharge lamps 2 and 3, the ballast 1 is set up for igniting the discharge lamps 2 and 3 by means of voltage breakdown. Accordingly, the electrodes 2a, 2b, 3a and 3b are short circuited outside of the discharge lamps 2 and 3, for example, in the lamp holders.

The supply of voltage to the discharge lamps 2 and 3 is served by the ballast 1 which, in the present exemplary embodiment, has an inverter 8 formed from three line branches 5, 6 and 7. The line branch 5 is directly connected to a voltage supply VDC which is constructed from circuit parts not illustrated in more detail and derived, for example, from a mains voltage. The supply voltage VDC is a DC voltage with a preferably constant magnitude. The electrodes 2a and 3a of the discharge lamps 2 and 3 are also connected to the supply voltage VDC. A switching transistor 11, which can be, for example, a bipolar transistor or a MOSFET, is arranged in the line branch 5. Its control electrode 12 is connected to a drive circuit 14 which supplies an AC voltage whose frequency assumes a first prescribed fixed value for operating the lamps and a second prescribed value, different from the first, for igniting the discharge lamps 2 and 3. The switching element 11 of the line branch 5 consequently opens and closes in time with the temporally symmetrical drive voltage.

The line branch 5 is jointly assigned to the two discharge lamps 2 and 3. The line branch 6 is connected in series with respect to ground to the line branch 5. The line branch 6 contains a switching element 15 which can be formed by a switching transistor, such as a bipolar transistor or a MOSFET or some other type of field-effect transistor. Connected in series with the switching element 15 is a decoupling diode 16 whose polarity is selected such that when the switching element 11 is conducting, it is possible for a current to flow to the discharge lamp 2 via the line branch 5. In the present example, the cathode of 16 is connected to the switching element 15. The tie point between the cathode of the diode 16 and the switching element 15 is connected to the electrode 2b of the discharge lamp 2 via a current-limiting inductor 17 and a coupling capacitor 18.

The line branch 6 is assigned solely to the discharge lamp 2. For the purpose of driving its switching element 15, the AC voltage supplied by the drive circuit 14 is applied to its control electrode 19 for operating the discharge lamp 2. Said AC voltage is fed to the control electrode 19 via an appropriate line 21 and a gate circuit 22. The gate circuit 22 can be formed by a gate, a controllable amplifier or an electronic switch. It has a blocking input 23 which, when it is supplied with a blocking signal, sets the output of the gate circuit 22, and thus the control input 19 of the switching element 15, to a potential at which the switching element 15 blocks reliably.

The line branch 7 is assigned to the discharge lamp 3. It has a switching element 25 and a decoupling element 26, which is connected in series therewith in the flow direction and is formed by a diode in the present example. The electrode 3b of the discharge lamp 3 is (connected to the tie point between the diode 26 and the switching element 25 via a decoupling inductor 27 and a coupling capacitor 28.

The switching element 25 has a control input 29, which is connected via a gate circuit 32 to the line 21, and thus to the control AC voltage supplied by the drive circuit 14. The gate circuit 32 also has a control input 33 which, when it is activated, causes the output of the gate circuit 32 to move to a potential at which the switching element 25 is reliably blocked.

The switching elements 15 and 25 are driven synchronously with one another in antiphase with respect to the switching element 11. The line branches 6 and 7 can be deactivated or activated independently of one another via the gate circuits 22 and 32, with the result that the discharge lamps 2 and 3 can be deactivated independently of one another.

The gate circuits 22 and 32 belong to a monitoring circuit 36 which monitors the lamp voltages. Before the ignition of the discharge lamps 2 and 3, the voltages dropping across the discharge lamps 2 and 3 assume relatively high values, which are necessary in order to cause a voltage breakdown in the discharge lamps 2 and 3. For this purpose, capacitors 37 and 38 are connected in parallel with the discharge lamps 2 and 3 and form a series resonant circuit with the current-limiting inductors 17 and 27, for example, in the case of a frequency above the normal operating frequency. Accordingly, a voltage step-up occurs at the electrodes 2b and 3b when the frequency supplied by the inverter 8 is in the range of the resonant frequency and when the discharge lamps 2 and 3 are still not yet ignited. This stepped up voltage is present on both sides of the coupling capacitor 18. In the present example, it is tapped at the current-limiting inductors 17 and 27 by the monitoring circuit 36. For this purpose, the tie point between the current-limiting inductor 17 and the coupling capacitor 13 is connected, for example, to a time monitoring module 41. The latter contains a rectifier which converts the AC voltage tapped at the tie point into a DC voltage.

The time-monitoring module 41 also contains a trigger which supplies a signal when the rectified AC voltage overshoots a threshold value. The threshold value is fixed such that it is undershot by a clear margin when the discharge lamp 2 is operating, but is overshot by a clear margin when a starting voltage is present across the discharge lamp 2. Downstream of the trigger is a timer which is triggered upon overshooting of the threshold value and supplies a signal at the output of the monitoring module 41 when the overshooting of the threshold value has lasted longer than a present time t.

An RS flipflop 43, which has a set input and serves as a memory, is connected to the time-monitoring circuit 41, possibly via a trigger 42. The output is connected to the control input 23 of the gate circuit 22. The RS flipflop circuit also has a reset input, which is connected to a reset circuit 44. The latter supplies a resetting signal when the main voltage has been switched off for longer than a predetermined time interval.

For the purpose of monitoring the ignition of the discharge lamp 3, the monitoring circuit 36 has appropriate modules, specifically a time-monitoring circuit 51 and a downstream trigger 52, as well as an RS flipflop 53. The interconnection corresponds to the interconnection of the elements for monitoring the discharge lamp 2.

The time-monitoring circuits 41 and 51 can also have a different internal makeup. What is essential is that they supply a signal at their outputs when the starting voltage is present across the respective discharge lamp 2 and 3 for longer than a predetermined period of time. This can also be achieved, for example, by a circuit which, after the mains voltage has been switched on, passes no signal for a presettable or preset time interval t and only after the lapse of this time interval supplies at its output a signal whose magnitude corresponds to the AC voltage present at its input. The output signal is then checked by the triggers 42 and 52 as to whether it is above or below a switching threshold.

The monitoring circuit 36 and the drive circuit 14 require an operating voltage which is clearly below the operating voltage VDC of the inverter 8. To generate this auxiliary voltage VH, the line branches 6 and 7 are respectively tapped with the capacitors 56 and 57, which are connected with one end to the tie point between the respective diodes 16 and 26 and the switching elements 15 and 25. Starting from this point, freewheeling diodes 58 and 59 also respectively lead to the operating voltage VDC of the invertor 8. The connection of the tapping capacitors 56 and 57 directly to one end of the current-limiting inductors 17 and 27 keeps the capacitive loading of the switching element 11 low, and this minimizes switching losses of the inductors 17 and 27.

The ballast described so far operates as follows:

When the mains voltage is switched on, the voltage VDC is produced at the input of the inverter 8. Via a starter circuit, the drive circuit 14 and the monitoring circuit 36 are provided with operating voltage. The drive circuit 14 now operates initially at an ignition frequency at which the inverter 8 is driven. The time circuit 44 transfers the RS flipflops 43 and 53, upon switching on, into a defined state in which they enable the gate circuits 22 and 32. The drive pulses thereby pass from the drive circuit 14 to the switching elements 15 and 25. The switching element 11 operates in a push-pull fashion relative to the switching elements 15 and 25 at the ignition frequency, at which the series resonant circuits formed from the series inductors 17 and 27 and the capacitors 37 and 38 come into resonance. Due to resonance step-up at the series resonant circuits, a relatively high starting voltage is produced across the discharge lamps 2 and 3. This leads within a prescribed ignition period in the case of operational discharge lamps 2 and 3 to voltage breakdown and thus to ignition of said lamps.

After the lapse of a set time t, which is preferably somewhat shorter than the time for which the drive circuit 14 supplies drive pulses at the ignition frequency, but may also be equal to or longer than this time if required, the monitoring circuit 36 checks the voltage across the discharge lamps 2 and 3 or the coupling capacitors 18 and 28. If the voltage is clearly higher than the operating voltage of an ignited discharge lamp 2 or 3, this is evaluated as a signal that the discharge lamp 2 or 3 has not ignited. In accordance therewith, the corresponding RS flipflop 43 or 53 receives a setting signal, whereupon it switches off the respectively assigned gate circuit 22 or 32. Consequently, the switching element 15 in the case of non-ignition of the discharge lamp 2 and the switching element 25 in the case of non-ignition of the discharge lamp 3 receive no more drive pulses. The relevant discharge lamp 2 or 3 is therefore no longer supplied with voltage, and the voltage dropping across the respective discharge lamp 2 or 3 vanishes, while the respective other discharge lamp 2 or 3 continues to operate unchanged if it has ignited.

Figure 2:
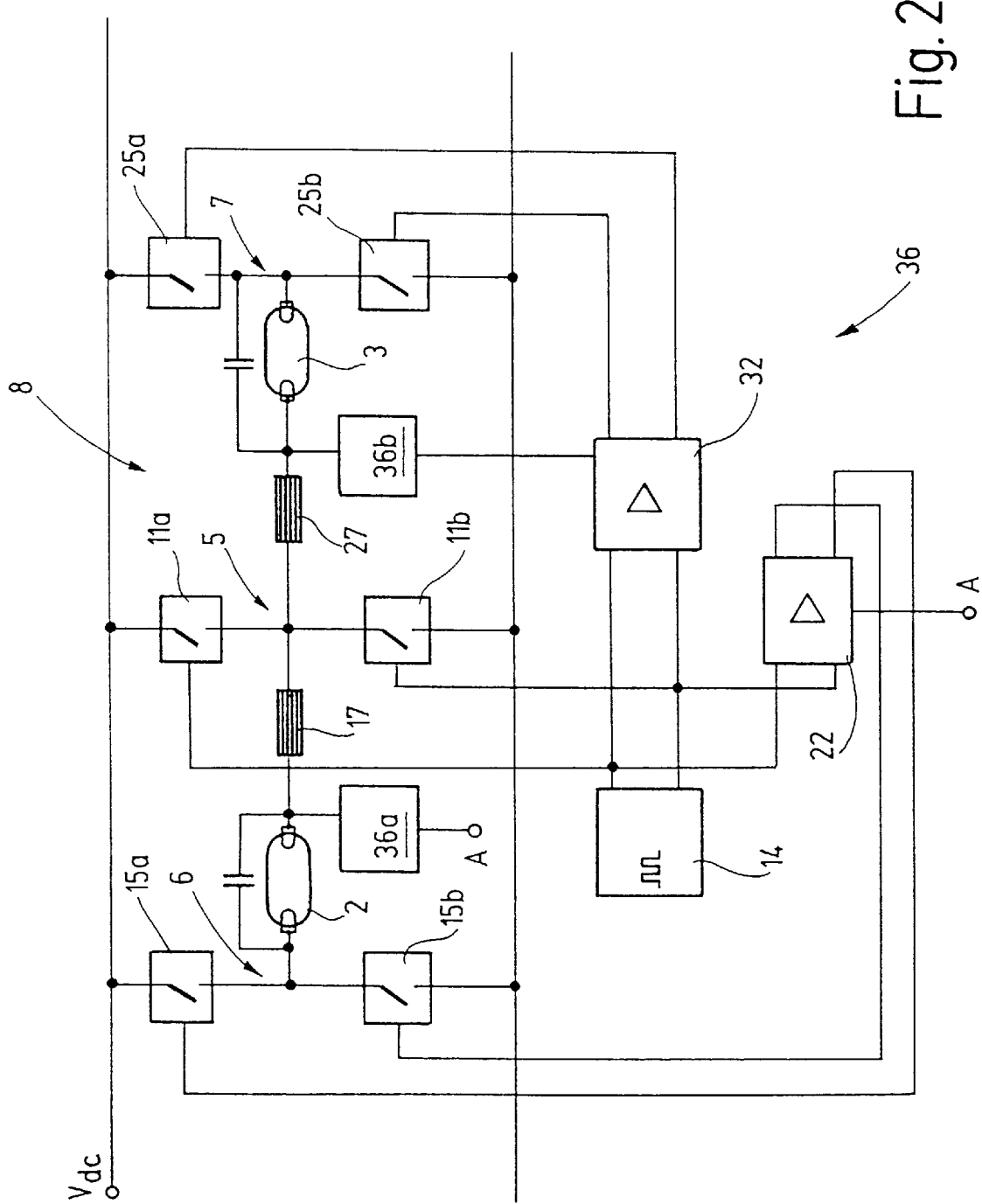
FIG. 2 shows the ballast according to FIG. 1 with a modified inverter.

In the case of the modified embodiment illustrated in FIG. 2, the invertor bridge 8 is formed by line branches or bridge branches 5, 6 and 7, which in each case contain two switching elements 11a, 11b, 15a, 15b, 25a and 25b. Although the invertor bridge contains a somewhat larger number of switching elements, it may be advantageous if the available operating voltage VDC of the inverter bridge 8 is lower.

The design of the monitoring circuit 36 corresponds to that of the monitoring circuit 36 according to FIG. 1, with the time-monitoring circuits 41 and 51, the triggers 42 and 52, the RS flipflops 43 and 53 and the power-on-reset 44 being represented in a form in which they are combined in symbolic blocks 36a and 36b. A further difference resides in the gate circuits 22 and 32, which must be capable of enabling and blocking both the inverted and the non-inverted drive signal. If the gate circuit 22 or 32 is enabled, it relays the pulses received at its input to its output. If it is blocked, it does not relay the input pulses, with the result that the assigned branch 6 or 7 blocks completely, and the corresponding discharge lamp 2 or 3 no longer receives a differential voltage at its terminals.

In a ballast for parallel operation of discharge lamps 2 and 3 in potentially explosive areas, an invertor 8 is provided which has a branch 5 which is assigned to the two discharge lamps 2 and 3 and in this respect is used twice, and two lamp-specific branches 6 and 7, which can be switched off separately if a fault occurs at the assigned discharge lamp 2 or 3.

What is claimed is:

1. A ballast for parallel operation of discharge lamps, comprising:
    an inverter including a plurality of line branches, each line branch having a respective switching element controlled via a control input, at least two of the plurality of line branches being individually assigned to a respective one of the discharge lamps;
    a drive circuit which is connected to the control inputs of the switching elements and switches the switching elements on and off; and
    a monitoring circuit for monitoring the voltages of the discharge lamps independently of one another to determine whether a starting voltage is present across the discharge lamps for longer than a preset time interval, and if a voltage detected across one or more of the discharge lamps at an instant of time after a given ignition time overshoots an operating voltage of the one or more of the discharge lamps, blocking, via the drive circuit, the driving of only the switching elements arranged in line branches assigned to the one or more of the discharge lamps.

2. The ballast as claimed in claim 1, wherein the detected voltage overshooting the operating voltage is situated approximately centrally between the operating voltage of the discharge lamps and the starting voltage.

3. The ballast as claimed in claim 1, further comprising a voltage source which supplies a prescribed DC voltage.

4. The ballast as claimed in claim 1, wherein the inverter has a common branch which is jointly assigned to two discharge lamps.

5. The ballast as claimed in claim 4, wherein the common branch is both part of a first half bridge for supplying a first discharge lamp and part of at least one further half bridge for supplying at least one further discharge lamp.

6. The ballast as claimed in claim 5, wherein the branches individually assigned to a respective one of the discharge lamps are connected to the common branch via decoupling elements.

7. The ballast as claimed in claim 6, wherein the decoupling elements are diodes.

8. The ballast as claimed in claim 1, wherein the inverter includes three line branches each having two switching elements, two of the line branches being individually assigned to a respective one of the discharge lamps, and the remaining line branch being jointly assigned to the discharge lamps.

9. The ballast as claimed in claim 1, wherein each discharge lamp is assigned a separate starter circuit.

10. The ballast as claimed in claim 1, wherein each discharge lamp is assigned a separate current-limiting means.

11. The ballast as claimed in claim 1, wherein each discharge lamp is assigned a monitoring device associated with the monitoring circuit.

12. The ballast as claimed in claim 1, wherein the monitoring circuit includes a storage device such that the monitoring circuit uses the storage device to maintain a blocking state for a line branch assigned to a respective one of the discharge lamps after the detection of a fault state for the respective one of the discharge lamps.

13. The ballast as claimed in claim 1, wherein the monitoring circuit is connected to a reset device such that the monitoring circuit uses the reset device to reactivate the inverter after a partial blocking of the inverter due to a fault in at least one of the discharge lamps.

14. The ballast as claimed in claim 1, further comprising tapping circuits which supply the drive circuit with current and are respectively connected to the line branches individually assigned to a respective one of the discharge lamps.

15. The ballast as claimed in claim 1, wherein the ballast is set up for igniting the discharge lamps by voltage breakdown when electrodes corresponding to the discharge lamps are cold.

* * * * *